May 22, 1945.   N. I. COCKLEY   2,376,573
CONTROL INSTRUMENT
Filed Nov. 13, 1941   3 Sheets-Sheet 1
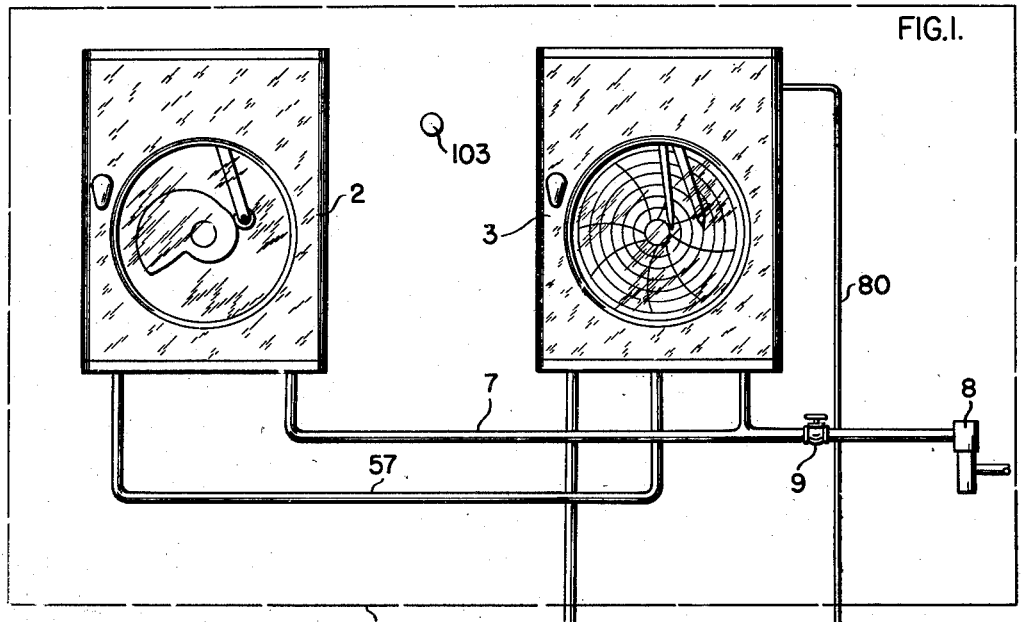
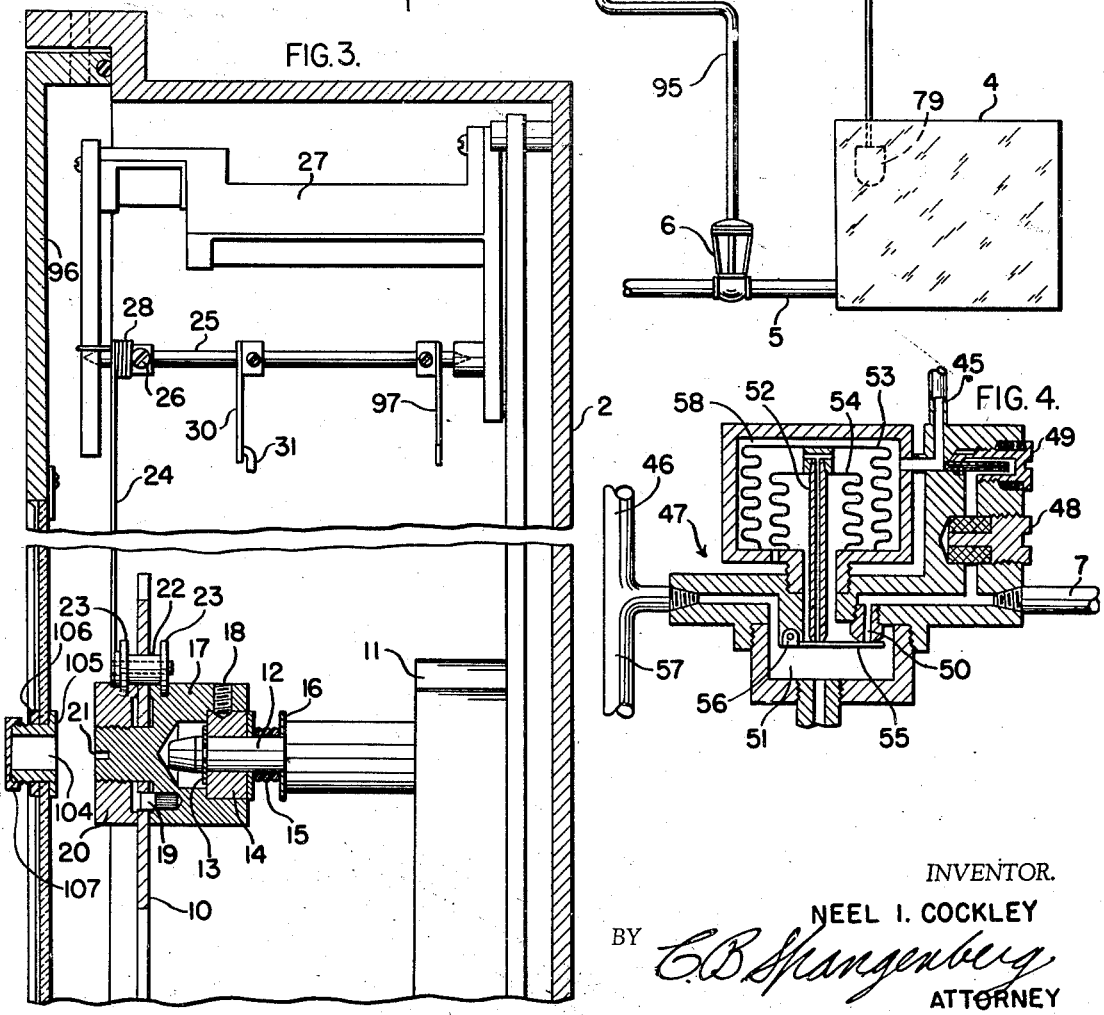
INVENTOR.
NEEL I. COCKLEY
BY C. B. Spangenberg
ATTORNEY

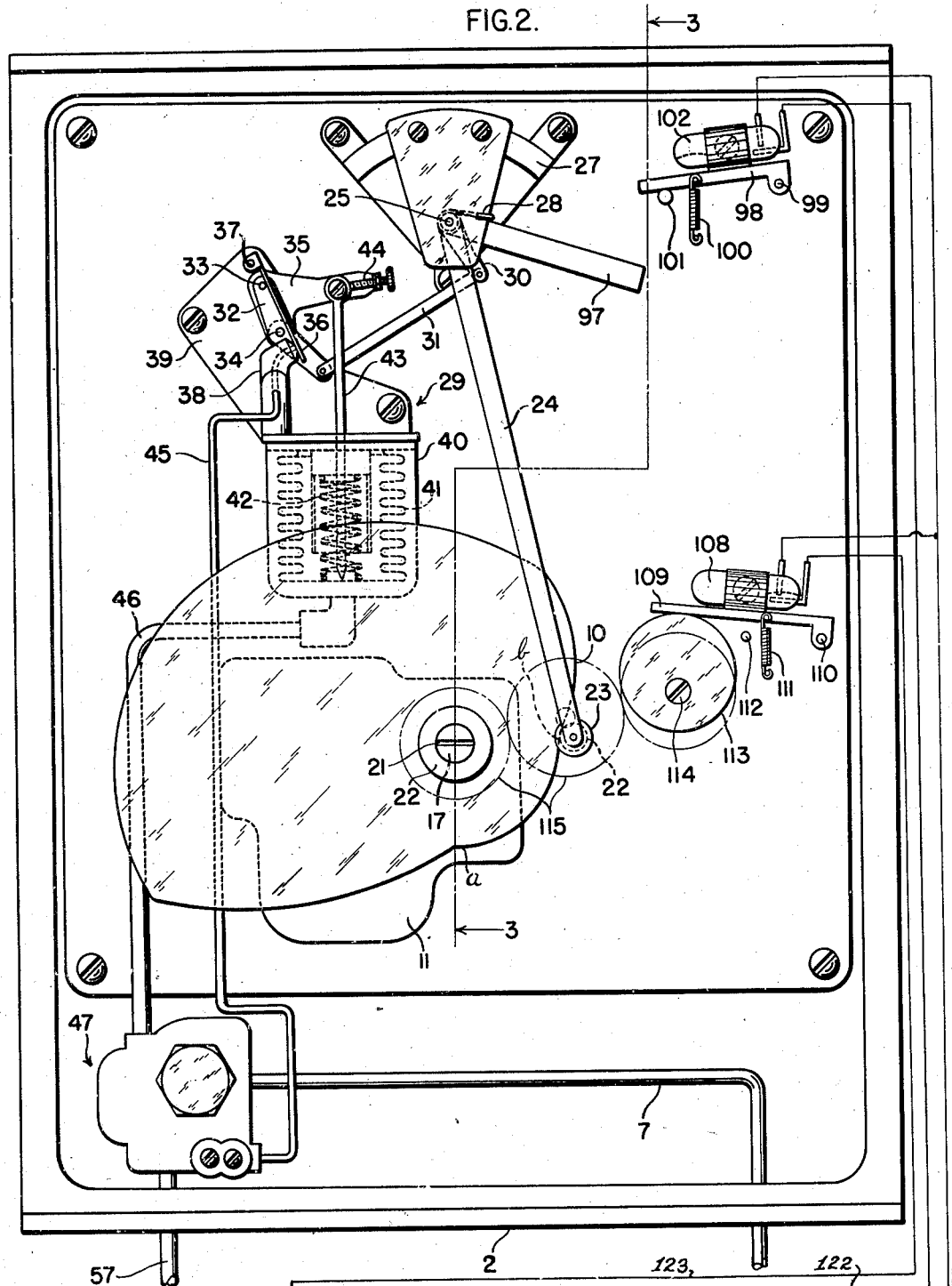

Patented May 22, 1945

2,376,573

UNITED STATES PATENT OFFICE 2,376,573

CONTROL INSTRUMENT

Neel I. Cockley, Chesney Downs, Pa., assignor to The Brown Instrument Company, Philadelphia, Pa., a corporation of Pennsylvania Application November 13, 1941, Serial No. 419,011

2 Claims. (Cl. 236—46)

The present invention relates to an automatic control system, and more particularly to a control system in which a time cycle device is used to adjust a variable condition such as temperature, pressure, liquid level or the like in accordance with a predetermined schedule.

It is often necessary in processing various articles to bring them, by way of example, up to a certain temperature at a predetermined rate, hold this temperature for a period of time and then lower it at a given rate. Various means have been provided to accomplish this result, one of which is to use a characterized cam to vary the control point of a control instrument according to the desired schedule. Such former devices have been subject to various objections, due most often to the complication that was caused by the insertion of the characterized cam into the same casing that houses the remainder of the control mechanism.

Generally the control cam is mounted on the same shaft as the record chart, if one is used. Since most charts are driven at one revolution per day the control cam must be driven at the same rate. This quite often results in a prohibitively steep rise on the cam if the condition being controlled must have its value changed at a rapid rate.

It is an object of the present invention to provide a time cycle control system in which a characterized control cam is used and in which the cam is driven independently of the record receiving chart. This means that the cam may be driven at any speed necessary and that the speed may be correlated with the contour of the cam to obtain any desired rate of condition change.

A further object of the invention is to provide a time cycle control system in which separate casings are used to house the recording and control mechanism and to house the control cam and its drive mechanism with these two portions of the control system joined by means of a pneumatic transmitting system. The arrangement is such that as the control cam is rotated it will move a follower that acts to set up an air pressure proportional to the radius of the cam. This air pressure is transmitted to a device in the recording and control unit that serves to adjust the control point of the same. Such a system is flexible enough to take care of practically any control schedule which it may be desired to have. The use of a pneumatic connection between the casings does away with the necessity of rigidly mounting one casing with respect to the other, or with the necessity of mounting them close to each other.

It is a further object of the invention to provide a time cycle control system in which an alarm or signal may be actuated at some point during the cycle.

The invention will be described herein, by way of example only, as controlling the temperature of a furnace or other heater. It will be recognized, however, that other variable conditions may be controlled in a similar manner.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings—

Fig. 1 is a view of the various units which form the control system.

Fig. 2 is a detail view of the cam actuated transmitting unit.

Fig. 3 is a section view taken on line 3—3 of Fig. 2.

Fig. 4 is a section view of the pilot valve and

Figure 5:
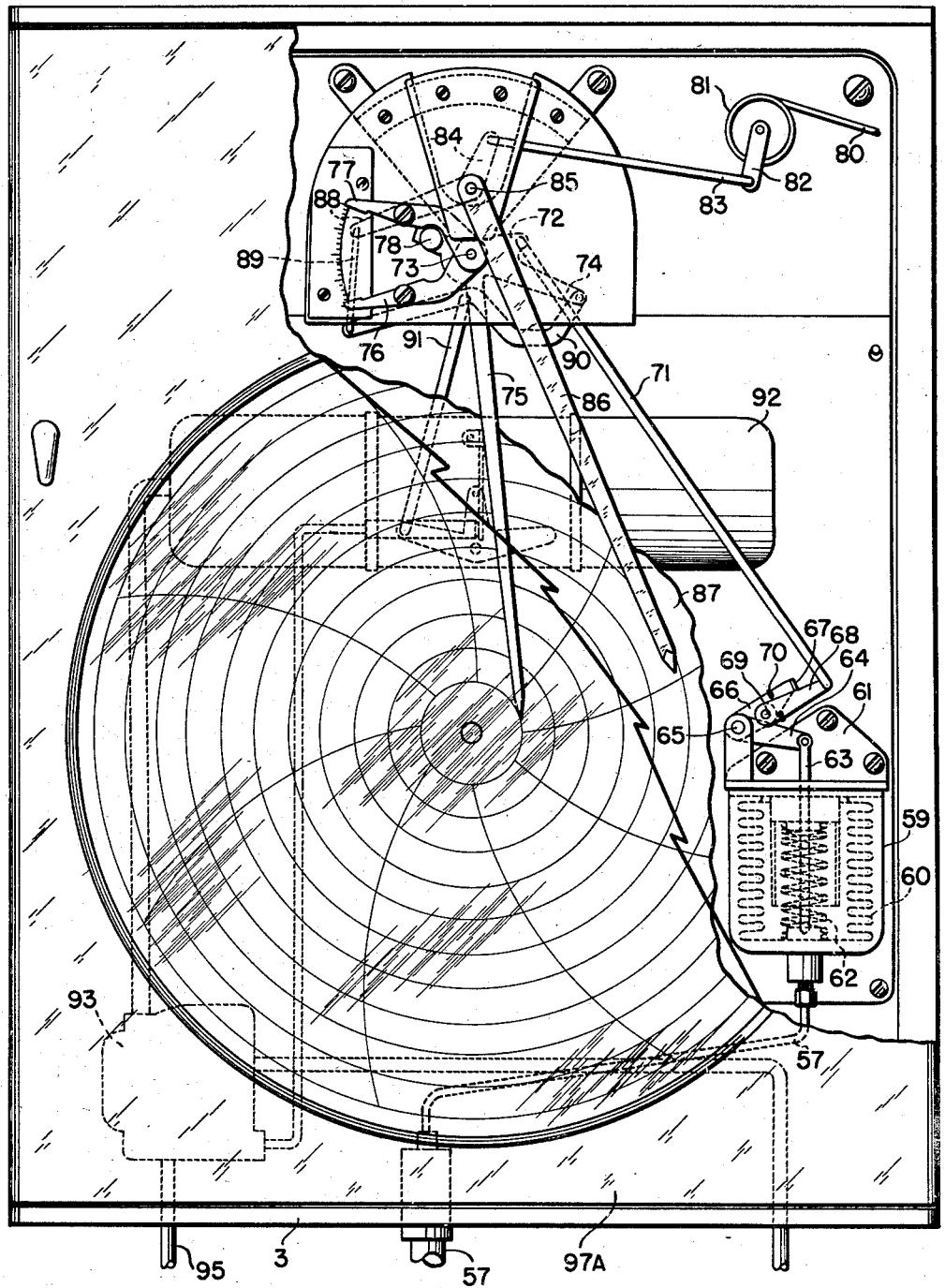
Fig. 5 is a detail view of the recording and control unit.

Referring first to Fig. 1 there is shown a panel board, 1 upon which it is preferred to mount the various units of the control system. The control system includes a transmitting unit 2 and a recording and control unit 3 which together serve to control the temperature of a furnace or other heater 4 that is supplied with fuel through a pipe 5 which fuel is regulated by a valve 6 that is located in the pipe. The arrangement is such that as the heater temperature varies the control unit 3 tends to open or shut the valve 6 as necessary to maintain the temperature of the heater at some desired value. The control point of the control unit or the value at which the temperature of the heater is to be kept is changed in accordance with a predetermined time-temperature schedule that has been plotted on a cam that is located in the transmitting unit 2.

Transmitting unit 2 which is shown in detail in Figs. 2, 3 and 4 will first be described. This unit along with the control unit is supplied with air under a suitably regulated pressure through a pipe 7 which is provided with a filter 8 and a pressure regulator 9. Located in the transmitting unit 2 is a cam 10 that is so shaped as to produce a predetermined schedule in the control of the heater 4. This cam is driven at a constant speed by means of a clock 11 that can be either electrically or spring operated.

The clock is provided with a shaft 12 that has on its front end an abutment member 13. Mounted on the shaft 12 back of this member 13 is a collar 14 that is pressed into frictional engagement with the abutment by means of a spring 15. The rear end of the spring bears against a washer 16 that is also rotatable on the shaft and which abuts against the end of a bearing for the shaft. A cam supporting member 17 is attached by means of a set screw 18 to the collar 14 so that it will rotate with the same as the clock shaft is driven. This cam support is provided with a drive pin 19 that is adapted to extend through a hole in the cam 10 when the cam is placed upon the protruding portion of the support 17. The front end of this protruding portion upon which the cam 10 is mounted is provided with screw threads adapted to receive a knurled thumb-nut 20. The thumb-nut is tightly screwed against the front of the cam to hold this cam in position on its support. The front of the projection on the support 17 is provided with a kerf 21 in which a screw driver may be inserted to rotate the support 17 and collar 14 relative to the drive shaft 12. This is possible since the spring 15 provides a frictional engagement between the collar 14 and the abutment 13. This provision is of importance since it permits the cam 10 to be rotated relative to its drive shaft to the proper starting position and also permits the cam to be rotated relative to the shaft if it is desired to speed up the control cycle.

A cam follower 22 that is provided with flanges 23 on each end so that it is the shape of a spool is adapted to bear on the surface of the cam 10 and to follow its contour. This follower is mounted on a supporting arm 24 that is in turn fastened to a shaft 25 by means of a set screw 26. This supporting shaft is mounted in suitable bearings that are provided in a bracket 27 which is attached to the casing of the unit 2. The cam follower is biased by gravity and a spring 28 into engagement with the edge of the cam so that it will always bear against the same.

Movement of the cam follower 22 and its supporting arm 24 are transferred to a pneumatic transmitting unit 29 by means of an arm 30 that is attached to the shaft 25 and a connecting link 31. This link is fastened at its lower end to one arm of a lever 32 the other arm of which is provided with a pin 33. The lever 32 is pivoted at 34 to an L shaped lever 35 which is in turn pivoted at a point that is directly underneath the pin 33 in the position of the parts as they are shown in Fig. 2. As the lever 32 is moved the pin 33 will move a flapper 36 around its pivot 37. This flapper is normally biased by gravity or a spring in a clockwise direction against a nozzle 38 which along with the lever arrangement just described, is mounted on a support 39. This support also has attached to it a casing 40, which along with a bellows 41, forms an expansible chamber. Located inside the bellows is a spring 42 which tends to expand this bellows against an air pressure which is applied within the chamber. Movement of the bellows is imparted, by means of a rod 43, to the L shaped lever 35 which lever serves to move the pivot point 34.

The rod 43 is attached to the lever 35 by means of an adjustable connection 44.

A nozzle 38 and the casing 40 are connected respectively by means of pipes 45 and 46 to a pilot valve 47 that is located in the lower left hand corner of the casing unit 2. This pilot valve is disclosed in detail in Fig. 4 and is supplied with air through the supply pipe 7. Air from the pipe 7 passes through a secondary filter 48 and a restriction 49 to the pipe 45. Air is also supplied by the same pipe to a nozzle 50 that opens into a chamber 51 of the pilot valve. Air may be exhausted from the chamber 51 through an exhaust nozzle 52 that is supported at its upper end by means of bellows 53 and 54. The pressure in the chamber 51 is directly controlled by means of a valve 55 that is pivoted at 56 to the pilot valve casing. The chamber 51 is connected to the pipe 46 which communicates with the casing 40, and is also in communication with a pipe 57 that supplies air under the same pressure to a control point adjusting unit in the unit 3.

As the radius of the cam 10 varies with respect to the position of the roller 22 the flapper valve 36 is moved closer to or further away from the nozzle 38 thus permitting more or less air to escape through this nozzle and thereby vary the pressure in the pipe 45 and a chamber 58 that forms part of the pilot valve and which has one wall formed of bellows 53. Therefore, as the pressure in this chamber varies the bellows 53 will expand or collapse and acting through the movable nozzle 52 will move the valve 55. If, for example, the pressure in chamber 58 is reduced due to movement of the flapper 36 away from the nozzle 38 the bellows 53 and 54 will elongate to lift the nozzle 52 away from the valve 55. Air can, therefore, escape from the chamber 51 through this nozzle and the inter-bellows space to the atmosphere. As a result of the reduced pressure in the chamber 51 and pipe 46 the pressure within casing 40 will be reduced, permitting the bellows 41 to elongate under the action of spring 42. As this occurs the lever 35 will turn in a clockwise direction around its pivot to shift the pivot point 34 of lever 32 in a direction to permit the flapper to be moved toward the nozzle 38, thereby giving a follow-up action. In this manner some given pressure is supplied in the casing 40, pipe 46 and pipe 57 for each position of the roller 22. It is noted that if the flapper 36 had originally been moved toward the nozzle 38 the pressure in chamber 58 would have been increased to collapse the bellows 53 and 54 thereby moving nozzle 52 downwardly. This nozzle would then move against the valve 55 and prevent further exhaust therefrom and would simultaneously shift the valve in a clockwise direction against its bias to open nozzle 50 and permit an increase in pressure in the chamber 51 with air that is supplied through line 7. This would produce an increase in pressure in chamber 40 to collapse the bellows 41 and thereby give a reverse follow-up movement to the flapper 36 from that which was previously described. Normally valve 55 closes both nozzle 50 and nozzle 52 so that there can be no pressure change in the system unless arm 24 is moved.

The pressure changes in the pipe 57 are transferred to the unit 3 and are there used to change the control point of that instrument. To this end the pressure changes are applied to a chamber that is formed between the casing member 59 and bellows 60 which are attached to a support 61 that is mounted in the back of the casing of unit 3. As pressure increases take place the chamber will be expanded and the bellows will collapse against the force of the bellows and a spring 62 that is mounted therein. Pressure decreases will permit the bellows to expand under the force of this spring. As the bellows changes in length a rod 63 will be raised or lowered to move an arm 64 which is mounted on a shaft 65 journalled in the support 61. The arm 64 is attached to the shaft 65 as is a secondary arm 66 so that these three members move as a unit. A member 68 which, in effect, forms an extension of the arm 66 is pivoted at 69 to that arm and is maintained against a bent over edge 67 of the arm 66 by means of a spring 70. As the arms 66 and 68 are moved around the shaft 65 as an axis a link 71, that is attached at its lower end to the member 68, imparts the movement of this member to a second member 72 that is pivoted on a shaft 73 in the upper part of the casing. This member 72 has an arm 74 that extends from it for a purpose that will be described later, and also has an index member 75 extending from it. The position of this index is an indication of the value at which the instrument will tend to maintain a condition under its control. Stop members 76 and 77 are pivoted on shaft 73 and may be fastened in various adjusted position with respect to this shaft. These stop members serve to cooperate with a projection 78 on the member 72 to limit the end positions of this member and, therefore, to limit the maximum and minimum values at which the condition can be maintained. If, for example, something went wrong with this system and the pressure in line 57 dropped to zero the arm 77 would be engaged by the projection 78 to limit the clockwise movement of this projection and, therefore, limit the minimum value to the condition will fall. In a like fashion, if something should go wrong and the pressure in the line 57 increased to a dangerous point the projection 78 would hit against the arm 76 and be limited in its counterclockwise movement. When the pressure falls to a minimum as above described, the bellows 60 would merely expand and a socket formed on its end wall would move away from the lower end of the rod 63. When the pressure increased, as above described, the bellows would collapse moving arm 64 and 66 in a counterclockwise direction. When projection 78 engages arm 76 the spring 70 will give and permit relative movement between parts 66 and 68. In this way over-travel of the bellows 60 will not tend to strain the various parts of the instrument.

The temperature of the heater 4 is measured by a temperature responsive bulb 79 that is filled with some temperature responsive liquid and which is connected by means of a capillary 80 to a Bourdon tube 81 mounted in the upper right hand corner of the unit 3. As the temperature in the heater changes this Bourdon tube will be expanded and contracted to move the arm 82 around its pivot. This arm is connected by means of a link 83 to a second arm 84 that is attached to a shaft 85. As the temperature increases the arm 84 and shaft 85 will be moved in a counterclockwise direction and will move with them a pen arm 86, which arm has a pen on its lower end that draws a record on a chart 87. Also attached to the shaft 85 is a second arm 88 that is connected by a link 89 to one end of a differential lever 90. The other end of this lever is attached to the outer end of arm 74. The arrangement is such that when either arm 74 or arm 88 is moved the lever 90 will be moved around one of its ends. This serves to raise and lower a connecting link 91 that actuates an air control instrument which may be of the type disclosed in Patent 2,125,081, which was issued to Coleman B. Moore on July 26, 1938. This air control instrument is of a well-known type that is in extensive commercial use and combines with it a pilot valve 93 which is similar to the pilot valve 47 above described. As the link 91 is moved up and down in response to either changes in the temperature as measured by the Bourdon tube 81 or in response to changes in the control point setting of the instrument as measured by the position of lever 74 the air control instrument 92 acting in conjunction with the pilot valve 93 will change the pressure in a line 95 to vary the opening of valve 6 in pipe 5. In this manner the valve is opened or closed in response to a change of either the control point position index or variations in the temperature of the heater.

Both the unit 2 and the unit 3 are preferably provided with doors which are shown at 96 in Figure 3 and at 97A in Figure 5. These doors are each provided with a glass window through which the cam and the recording chart, respectively, may be seen. In order that the cam 10 may be adjusted relative to the drive shaft 12 without the necessity of opening the door 96 of unit 2 an opening 104 is provided in the window of that door which is coaxial with the support 17. A screw driver or similar tool may be projected through this opening into the kerf 21 to adjust the cam. In order that the opening 104 may normally be kept closed a short flanged sleeve 105 is inserted in the opening and held in place by a nut 106 that is threaded over the sleeve into engagement with the outer surface of the glass. A cap 107 is then used to close the end of the sleeve. It is noted that the index 75 cooperates with the chart 87 to indicate thereon the value at which the condition is being maintained.

Sometimes it may be desirable to have an indication when the value of the condition of the heater 4 has reached some predetermined point or where the process has reached a predetermined state. To this end an arm 97 is attached to the shaft 25 for movement with the shaft as the cam 10 rotates. This arm is used to engage the left end of a switch operating member 98 that is pivoted at 99 to move this member against the bias of a spring 100. The support is normally maintained in the position shown in which its position is limited by a stop 101. Any suitable type of switch such as a mercury switch 102 may be operated when arm 24 is moved counterclockwise enough to tilt the support 98. This switch may be used to light an indicating light 103 that is preferably mounted on the control panel 1 shown in Fig. 1. If it is desired the switch 102 could be turned end for end in which case the light 103 would be on until the cam has reached a certain position when the tilting of the support 98 would cause the switch to open.

Sometimes it may also be desired to have an indication or an operation of some type performed a predetermined time after the cycle of the instrument has begun. To this end there is provided a switch 108 that may be closed or opened, as the case may be, a predetermined time after the operation is started. This switch is mounted on a support 109 that is pivoted at 110 and biased by spring 111 in a counterclockwise direction into engagement with a stop pin 112. The support is adapted to be tilted to actuate the switch by means of a cam 113 that is frictionally held on a shaft 114 in any suitable manner. Shaft 114 is driven at a constant speed through a train of gears 115 from the clock 11. The cam 113 can be made to take any desired shape and can be so adjusted on the shaft 114 that a predetermined time after the cycle of the instrument is started this cam will tilt the support 109 around its pivot 110. The switch 108 will then be either closed or opened depending upon how it is mounted on this support to actuate any suitable signal or alarm or to actuate a relay to perform some desired operation.

As shown in Figure 2, the switch 102 is connected to the indicating light 103 and to a battery or other suitable source of power 120 by means of wires 121 and 122 so that when the switch is closed, the lamp will be energized. In a like manner, the switch 108 is connected with the source of power 120 and the signal light 103A by means of wires 121 and 123 so that when this switch is closed, lamp 103A will be energized.

The use of signals or alarms that can be operated both a predetermined time after the process has been started or when the condition has reached a predetermined value can be very useful inasmuch as they can be used to perform any operation connected with the cycle of the instrument or can be used to warn an operator that the condition has reached a predetermined value or that the process has been under treatment for a predetermined time.

The operation of the control system would be apparent from the above description. However, a resume will now be given. As the cam 10 rotates it will act on the lever arm 24 and, through the unit 29, will serve to vary the air pressure in pipe 57 in accordance with the contour cam. This air pressure is applied through the pipe 57 to cause a change in length of bellows 60 where it is used to actuate a lever system and move the control index 75. As this movement occurs the right end of the differential lever 90 will be raised or lowered to change the control point of the air control instrument 2. Therefore, the instrument will change the temperature at which it is maintaining the heater 4 by varying the opening of the valve 6 and, therefore, adjusting the amount of the condition changing fluid which can flow through the pipe 5.

In most recording instruments the chart 87 is run at a speed of one revolution in 24 hours. This is almost standard since it is desirable to keep a day by day record of the functioning of the apparatus being controlled. The cycle through which the heater 4 is being controlled may only last a fraction of this time, however, so that several cycles will be produced over a 24 hour period. In such case it is generally desirable to have the cam make one complete revolution for each heating cycle. To this end the clock 11 runs the cam 10 at a speed of only one revolution for each of the cycles to which the heater 4 is subjected. Assume, for example, that each cycle takes an hour and one-half. As shown herein the clock is so designed that it will have one rotation every two hours. Also as shown, the cam 10 and the roller 22 are positioned as they would be at the start of a cycle. As the cam rotates in a clockwise direction the arm 24 will be moved outwardly to gradually raise the pressure in the system and, therefore, raise the control point of the instrument 3. This is raised at a certain rate for a certain length of time and then is brought back to a zero position at the end of an hour and one-half. The last fifteen minutes of rotation of the cam which is indicated by the concentric portion a—b will have no effect on the arm 24, and the latter will remain in its zero position. This 15 minutes may be used to clean out the heater and to insert a new batch of what is being heated. At that time the rotation of the cam will be completed. It may be preferred to rotate the cam once every hour and a half, then stop it while the batch in the heater is being changed, instead of having the fifteen minute waiting interval formed on the cam. It will be obvious that the speed at which the cam is driven may be changed in accordance with the cycle through which the heater is being put. If, for example, the cycle should take place in six hours the cam may be rotated every six hours, or the cam may be rotated in twelve hours and have two six hour cycles cut on it. It is a highly desirable feature of the system that the chart is rotated at one speed while the cam can be rotated at another speed which speed can be made to suit a cycle of treatment to which the heater will be subjected. Being able to change the speed at which the cam is rotated in any conventional manner to correspond to the time of the cycle permits the slope of the cam to be so formed that no unduly steep rise will be used and so there will be no danger of the roller 22 binding on the cam as the latter is rotated.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. A pneumatic transmitting instrument for transmitting a pressure in accordance with a predetermined time-condition schedule, comprising in combination, a time operated cam shaped along its time component in accordance with desired values of a condition to produce a predetermined time-condition schedule, means to move said cam, a cam follower moved to positions depending upon the contour and position of said cam, valve means for establishing a pressure to be transmitted, means for connecting the cam follower and the valve means for maintaining the pressure at a value corresponding solely to the position of the cam follower and hence solely in accordance with the time-condition schedule, a switch, a signal means operated thereby, and operating means for said switch solely actuated by said cam follower to operate the signal means when the pressure established by the valve means reaches a predetermined value.

2. A pneumatic transmitting instrument for transmitting a pressure in accordance with a predetermined time-condition schedule, comprising in combination, a time operated cam shaped along its time coponent in accordance with desired values of a condition to produce a predetermined time-condition schedule, means to move said cam, a cam follower moved to positions depending upon the contour and position of said cam, valve means for establishing a pressure to be transmitted, means for connecting the cam follower and the valve means for maintaining the pressure at a value corresponding solely to the position of the cam follower and hence solely in accordance with the time-condition schedule, a pair of signal means, one of said signal means being operated by said cam moving means at a predetermined point in the rotation of said cam, and means solely operated by said cam follower to actuate the other signal means when the pressure established by the valve means reaches a predetermined value.

NEEL I. COCKLEY.